R. H. LEA & C. H. INGALL.
MOUNTING THE WHEELS OF VELOCIPEDES AND THE LIKE.
APPLICATION FILED MAR. 25, 1913.
1,096,634.
Patented May 12, 1914.
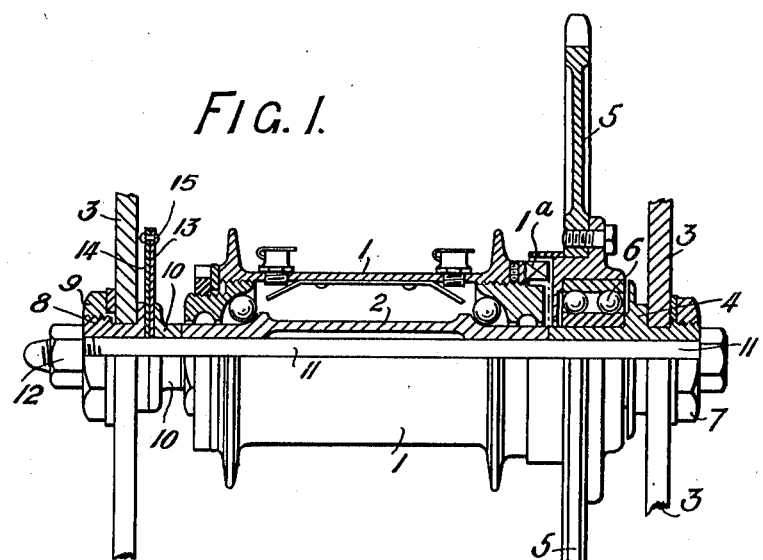
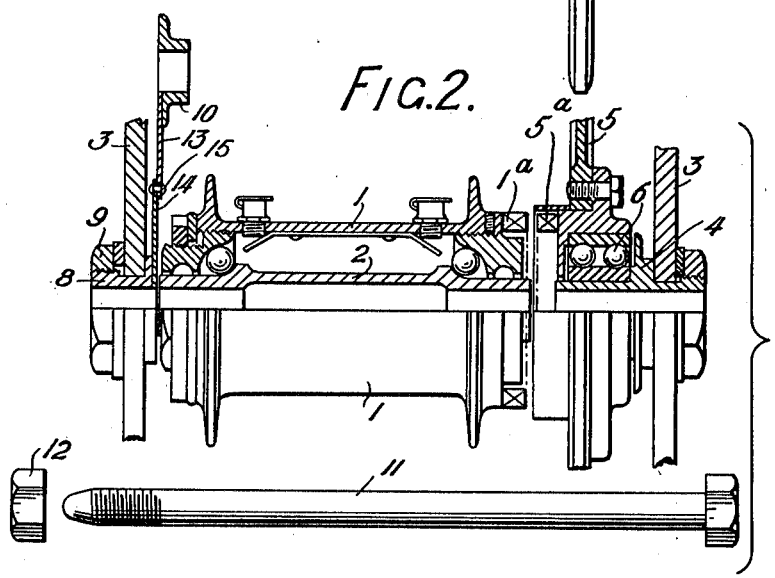

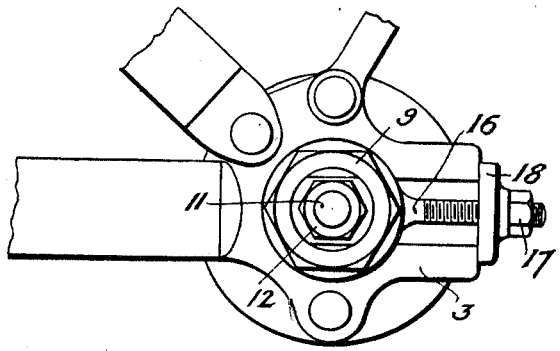
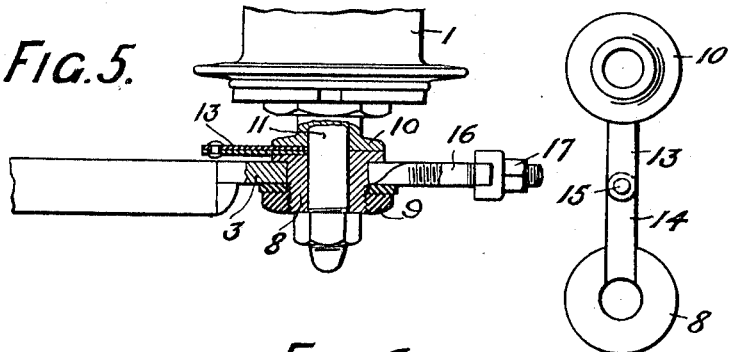
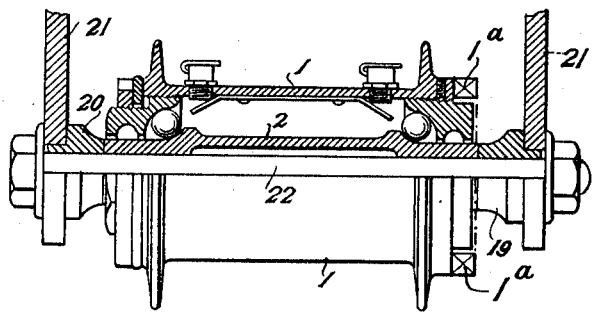

UNITED STATES PATENT OFFICE.

RICHARD HENRY LEA AND CLIFFORD HATELEY INGALL, OF COVENTRY, ENGLAND.

MOUNTING THE WHEELS OF VELOCIPEDES AND THE LIKE.

1,096,634.  Specification of Letters Patent.  Patented May 12, 1914.

Application filed March 25, 1913. Serial No. 756,723.

*To all whom it may concern:*

Be it known that we, RICHARD HENRY LEA and CLIFFORD HATELEY INGALL, subjects of the King of Great Britain, both residing at Coventry, Warwickshire, England, have invented certain new and useful Improvements in the Mounting of the Wheels of Velocipedes and the like, and of which the following is a specification.

This invention relates to improvements in the mounting of the wheels of velocipedes and the like, of the kind in which the complete bearing with the hub and the wheel itself may be readily removed from the forks or frame by moving the said hub in the direction of its axis, after withdrawing a locking bolt which passes through the center of the bearing and through both sides of the fork or frame, and the construction according to this invention enables the driving sprocket or belt wheel, which is carried in independent bearings on the bolt carrying the bearings of the hub of the driven road wheel, to communicate power to such hub by means of a flexible coupling, that is to say a coupling permitting of small freedom of movement between the hub and the sprocket wheel so that there shall be no binding action upon the ball bearings, at the same time enabling the driven road wheel to be removed from the machine and be replaced in position without disturbing the alinement of the parts receiving the locking bolt on both sides of the frame, or springing of the said forks or frame.

The present invention comprises a driving connection or coupling between the driving sprocket or belt wheel and the driven road wheel, the co-acting members of which coupling have a free connection and preferably consist of axially extending teeth on the hub of the sprocket wheel, engaging corresponding axially extending teeth on the hub of the road wheel, by means of which flexible coupling any binding action on the ball bearings is prevented. Provided in the fork or frame member opposite to that by which the driving or sprocket wheel axle is carried is an adjustable stud, which stud is fixed to said member and has pivoted thereto a sleeve or nipple, adapted, when the locking bolt is removed, to be swung outwardly so as to allow of the axial movement of the hub and bearings of the road wheel to cause the disengagement of the teeth carried thereby from the teeth on the sprocket wheel when it is desired to remove the said wheel from between the forks, the stud in the one fork being fixed in axial alinement with the driving or sprocket wheel axle carried in a stationary manner in the other fork, so that true axial alinement is insured when the wheel is replaced in position between the said forks.

Obviously the road wheel with its hub may be removed from the position wherein it acts as a driven road wheel and be placed in another part of the frame, or if in a bicycle in the front forks, and the wheel and hub from the latter position may be placed in the rear forks, that is one road wheel in a machine can be interchangeable with a road wheel in another position.

In order that the invention may be clearly understood, reference is made to the accompanying drawings, in which—

Figure 1 is an elevation half in section showing the parts mounted and fixed in their proper relative positions. Fig. 2 shows by a similar view the same mechanism with the bolt withdrawn and the hub of the road wheel moved laterally in the direction of its axis ready for removal, while the bolt and nut are shown separately below such parts. Fig. 3 is a detail view showing in end view the stud which is to be fixed to the frame, and also showing a nipple forming the removable portion of the said stud. Fig. 4 shows in side elevation an example of construction of the end of the fork in which the stud is carried, and illustrates means of adjusting the said stud at right angles to its axis, Fig. 5 being a sectional plan view of the same showing an adjusting device. Fig. 6 is an elevation partly in section showing the road wheel hub illustrated at Figs. 1 and 2, transferred to and carried by the front wheel forks of say a bicycle.

Referring to the drawings, the hub 1 is of the usual or any desired construction and is carried in the ordinary way by ball bearings, and has a tubular axle 2. The said axle is located between the tubular axle 4 of the sprocket wheel and a tubular stud 8, which are, axle and stud, normally fixed as by clamping to the frame 3 of the machine. Illustrated at the right hand of Fig. 1 is the tubular axle 4 which is to carry the sprocket wheel 5, there being ball bearings 6 carried by the axle upon which the sprocket wheel 5 revolves, and the tubular axle 4 passes through the frame 3 or is slid up the fork of the frame 3 as illustrated in the drawing and is clamped to the said frame by a nut 7 screwed on the threaded end of the axle 4. The boss or hub of the sprocket wheel 5 is formed with teeth 5ª extending in an axial direction, which teeth engage with corresponding teeth 1ª on the end of the hub 1, the teeth on the respective hubs being of such a length that the top of the teeth on the hubs shall not contact with the surface of the recesses between the teeth on the adjacent hubs thereby permitting of small freedom of movement between the hub and the sprocket wheel so that there shall be no binding action upon the ball bearings. The stud 8 is similarly clamped to the frame by a nut 9 and in conjunction with this stud 8 a removable tubular nipple 10 is provided which is located, when the parts are in position, coaxial with the stud 8 and consequently with the other parts of the device, and 11 is the locking bolt which passes through the sprocket wheel axle 4, through the road wheel axle 2, the removable nipple 10, and the stud 8, and it is fitted with a nut 12 by which the parts are held in position.

In removing the hub from the structure, the bolt 11 is firstly withdrawn and then it is obviously necessary to shift the hub 1 with its axle 2 laterally in the direction of its axis and therefore the tubular nipple 10 is first moved into the position in which it is shown in Fig. 2, which leaves the hub free, and by this lateral motion the teeth 1ª on the end of the hub 1 are disengaged from the teeth 5ª on the sprocket wheel and the said hub and axle 2 can be taken away from the frame.

When the hub is to be replaced, after it has been put in position and moved laterally into engagement with the sprocket wheel 5, the nipple 10 must be placed in position in contact with the end of the stud 8, and since this replacement in a position coaxial with the said stud would be inconvenient without some guide, we connect or carry the said nipple 10 from a convenient part, so that it can be turned or slid into accurate position. As an example the nipple 10 as shown in the drawings is fitted with an arm 13, the end of which is pivoted at 15 to an arm 14 which is fixed to and extends from the stud 8, so that when the hub is to be removed and the bolt 11 is withdrawn, the nipple 10 is turned aside about the pivot 15, so that not only is loss of the nipple impossible, but also when replacing the parts it can be turned into true alinement with the stud 8 and so permit of the reëntry of the bolt 11.

It will now be well understood that the wheel with its hub can be taken away from the frame, and yet leave not only the sprocket wheel axle 4 but also the stud 8 in their fixed and properly adjusted positions, their relative alinement not being in any way disturbed, and moreover when it is requisite to adjust the position of the wheel parallel to its axis, in order to tension the chain or belt, such adjustment can be made while all the parts carried by the bolt 11 are in true alinement; that is, in such an adjustment device as is shown in Figs. 4 and 5, it is only necessary to loosen the clamping nuts 7 and 9 so as to free the axle 4 and the stud 8, and then all the parts as a single mechanism can be adjusted by the adjustment device, consisting of the usual draw bolt 16 engaging the nut 17 bearing against the cross head 18.

As already stated the wheel with its hub may be removed from the position in which it acts as the driven road wheel and be placed in another part of the frame, and at Fig. 6, there is illustrated the hub 1, previously described, transferred to the front forks for example of a bicycle, there being provided to this end two nipples 19, 20 taking into the forks 21, and a bolt 22 is then passed through the nipples 19 and 20 and through the tubular axle 2 of the hub clamping the parts firmly in position.

What we claim as our invention and desire to secure by Letters Patent is:—

1. In a mounting for wheels of velocipedes and the like; the combination with a tubular axle adapted to receive the hub of the road wheel to be driven, bearings between said hub and said axle, a driving wheel, a tubular axle to support said driving wheel, bearings between said driving wheel axle and the hub of said driving wheel, means to secure said driving wheel axle to the vehicle frame in one side member thereof, a tubular stud attached to the opposite side member of said frame and in axial alinement with said driving wheel axle, means to retain said tubular stud and the axles of said road and driving wheels in axial alinement between said frame side members; of a readily disconnectible driving connection between the hub of said road wheel and the hub of said driving wheel, said connection being adapted to allow of universal movement between the two said hubs, and removable means to normally present endwise movement of said road wheel axle away from said driving wheel axle for the purpose set forth.

2. In a mounting for wheels of velocipedes and the like; the combination with a tubular axle adapted to receive the road wheel to be driven, axially extending teeth on one end of said hub, bearings between said hub and said axle, a driving wheel a tubular axle to support said driving wheel, bearings between said driving wheel axle and the hub of said driving wheel, axially extending teeth on the hub of said driving wheel adapted to engage the teeth on the hub of said road wheel and so constructed that the ends of the teeth on the said hubs shall not contact with the rear faces of the recesses between the teeth on the said hubs, means to secure said driving wheel axle to the vehicle frame in one side member thereof, a tubular stud attached to the opposite side member of said frame and in axial alinement with said driving wheel axle; of means to retain said tubular stud and the axles of said road and driving wheels in axial alinement between said frame side members, and removable means to normally prevent endwise movement of said road wheel axle away from said driving wheel axle for the purpose set forth.

3. In a mounting for wheels of velocipedes and the like; the combination with a tubular axle adapted to receive the hub of the road wheel to be driven, bearings between said hub and said axle, a driving wheel, a tubular axle to support said driving wheel, bearings between said driving wheel axle and the hub of said driving wheel, means to secure said driving wheel axle to the vehicle frame in one side member thereof, a tubular stud attached to the opposite side member of said frame and in axial alinement with said driving wheel axle, means to retain said tubular stud and the axles of said road and driving wheels in axial alinement; of a readily disconnectible driving connection between one end of the hub of the driving wheel and the adjacent end of the hub of the road wheel, said connection being adapted to allow of universal movement between the two said hubs, and a distancing piece movably connected to the inner end of said tubular stud and adapted to lie between said end of said stud and the adjacent end of the axle of the road wheel to retain the said road wheel in position with relation to the driving wheel and to be moved in a direction at right angles to the axis of said road wheel to enable said road wheel to be moved axially between said side frames to disconnect said coupling.

4. In a mounting for wheels of velocipedes and the like; the combination with a tubular axle adapted to receive the hub of the road wheel to be driven, bearings between said hub and said axle, a driving wheel, a tubular axle to support said driving wheel, bearings between said driving wheel axle and the hub of said driving wheel, means to secure said driving wheel axle to the vehicle frame in one side thereof, a tubular stud attached to the opposite side of said frame and in axial alinement with said driving wheel axle, a removable locking bolt extending through said tubular stud and the axles of said road and driving wheels to retain said stud and said axles in axial alinement between said frame side members, means to retain the locking bolt in position; of a tubular nipple through which said bolt passes, arranged between the inner end of said tubular stud and the adjacent end of said road wheel axle said nipple being removable to allow of movement of said road wheel in an axial direction away from said driving wheel, and a readily disconnectible driving connection between the hub of the said road wheel and the hub of said driving wheel, said connection being adapted to allow of universal movement between the two said hubs, substantially as set forth.

5. In a mounting for wheels of velocipedes and the like; the combination with a tubular axle adapted to receive the hub of the road wheel to be driven, bearings between said hub and said axle, a driving wheel, a tubular axle to support said driving wheel, bearings between said driving wheel axle and the hub of said driving wheel, means to secure said driving wheel axle to the vehicle frame in one side member thereof, a tubular stud attached to the opposite side member of said frame and in axial alinement with said driving wheel axle, means to retain said tubular stud and the axles of said wheels in axial alinement, a readily disconnectible driving connection between one end of the hub of the driving wheel and the adjacent end of the hub of the road wheel; said connection being adapted to allow of universal movement between the two said hubs, of a distancing piece adapted to lie between the inner end of said tubular stud and the adjacent end of the axle of the road wheel, and a path controlling connection between said distancing piece and said tubular stud to enable said distancing piece to be moved in a direction at right angles to the axis of said road wheel and allow said wheel to be moved axially between said side frames to disconnect said coupling.

6. In a mounting for wheels of velocipedes and the like; the combination with a tubular axle adapted to receive the hub of the road wheel to be driven, bearings between said hub and said axle, a driving wheel, a tubular axle to support said driving wheel, bearings between said driving wheel axle and the hub of said driving wheel, means to secure said driving wheel axle to the vehicle frame in one side member thereof, a tubular stud attached to the opposite side member of said frame and in axial alinement with said driving wheel axle, a radially extending arm secured to the inner end of said stud, a removable locking bolt extending through said tubular stud and the axles of said road and driving wheels to retain said stud and said axles in axial alinement, means to retain the locking bolt in position; of a tubular nipple through which said bolt passes, arranged between the inner end of said tubular stud and the adjacent end of said road wheel axle, a radial arm extending from said nipple at that end adjacent to said tubular stud, a pivotal connection between the free ends of the radial arms on the said tubular stud and tubular nipple to enable said tubular nipple to be moved in a direction at right angles to the axis of said road wheel to allow of movement of the said road wheel in an axial direction away from said driving wheel, and a readily disconnectible driving connection between the hub of the said road wheel and the hub of the said driving wheel, said connection being adapted to allow of universal movement between the two said hubs, substantially as set forth.

7. In a mounting for wheels of velocipedes and the like; the combination with a tubular axle adapted to receive the hub of the road wheel to be driven, axially extending teeth on one end of said hub, bearings between said hub and said axle, a driving wheel, a tubular axle to support said driving wheel, bearings between said driving wheel axle and the hub of said driving wheel, means to secure said driving wheel axle to the vehicle frame in one side member thereof, axially extending teeth on the hub of said driving wheel adapted to engage the teeth on the hub of said road wheel and so constructed that the ends of the teeth on the said hubs shall not contact with the rear faces of the recesses between the teeth, a tubular stud attached to the opposite side member of said frame and in axial alinement with said driving wheel axle means to retain said stud and said axles in axial alinement; of a distancing piece adapted to lie between the inner end of said tubular stud and the adjacent end of the axle of the road wheel, and a path controlling connection between said distancing piece and said tubular stud to enable said piece to be moved in a direction at right angles to the axis of said road wheel and allow said wheel to be moved axially between said side frames so that the teeth of the hub of said road wheel become disengaged from the teeth of the hub of said driving wheel substantially as and for the purpose set forth.

8. In a mounting for wheels of velocipedes and the like; the combination with a tubular axle adapted to receive the hub of the road wheel to be driven, axially extending teeth on one end of said hub, bearings between said hub and said axle, a driving wheel, a tubular axle to support said driving wheel, bearings between said driving wheel axle and the hub of said driving wheel, means to secure said driving wheel axle to the vehicle frame in one side member thereof, axially extending teeth on the hub of said driving wheel adapted to engage said teeth on said road wheel hub and so constructed that the ends of the teeth on the said hubs shall not contact with the rear faces of the recesses between the teeth, a tubular stud attached to the opposite side member of said frame and in axial alinement with said driving wheel axle, a radially extending arm secured to the inner end of said stud, a removable locking bolt extending through the said tubular stud and the axles of said road and driving wheels to retain said stud and said axles in axial alinement; means to retain the locking bolt in position; of a tubular nipple through which said bolt passes, arranged between the inner end of said tubular stud and the adjacent end of said road wheel axle, a radial arm extending from said nipple at the end adjacent to said stud, and a pivotal connection between the free ends of the radial arms on the said tubular stud and tubular nipple to enable said tubular nipple to be moved in a direction at right angles to the axis of said road wheel and allow of movement of the said road wheel in an axial direction away from said driving wheel, substantially as set forth.

In witness whereof we have hereunto set our hands in the presence of two witnesses.

RICHARD HENRY LEA.
CLIFFORD HATELEY INGALL.

Witnesses:
  PERCY A. ELLIS,
  W. H. LEE.

---

Copies of this patent may be obtained for five cents each, by addressing the "Commissioner of Patents, Washington, D. C."